Patented Sept. 28, 1937

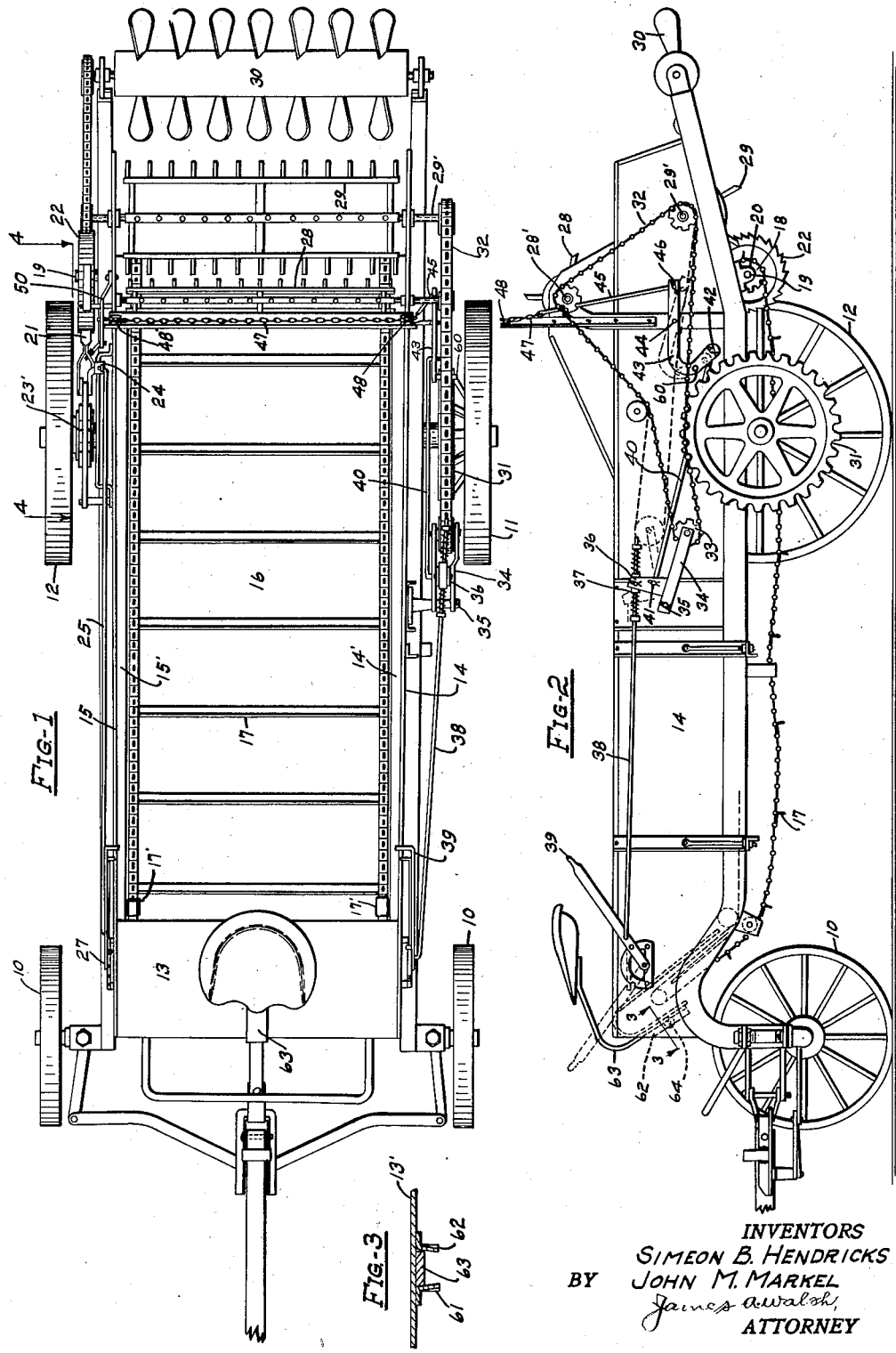

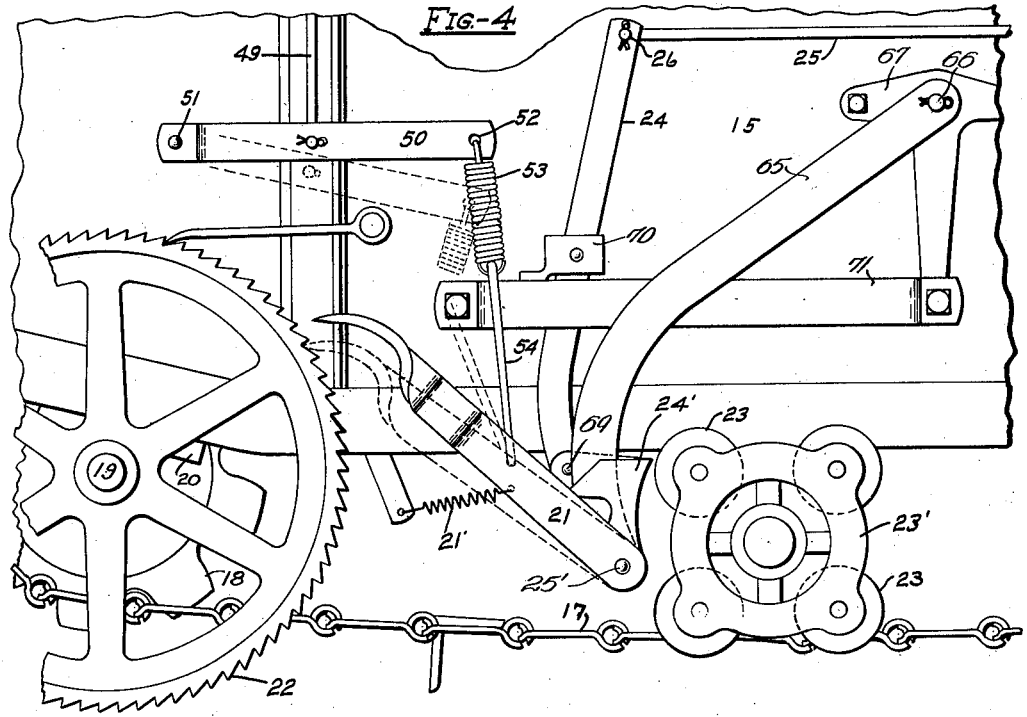

2,094,572

UNITED STATES PATENT OFFICE 2,094,572

MANURE SPREADER

Simeon B. Hendricks and John M. Markel, Rockford, Ill., assignors to J. I. Case Company, Racine, Wis., a corporation Application July 8, 1935, Serial No. 30,320

5 Claims. (Cl. 275—5)

Manure spreaders, or distributors, as commonly built, consist of an elongated box mounted on suitable carrying wheels, the box having a bottom, an inclined forward end, two sides and an open rear end at which the beaters and distributor are located. The sides of said box are placed somewhat closer together at the front end than at the rear so as to provide a "draft" for the material which is caused to be moved rearwardly by a continuous conveyor placed upon the bottom of the box and which is operated through an intermittent drive mechanism actuated by the rear wheels. As the spreader is drawn over a field the material is moved to the beaters which separate or disintegrate the fertilizer, feeding it rearwardly to the distributor by which it is thrown laterally so as to cover a considerable surface behind the moving vehicle, all in a manner well known. The beater and spreader mechanism is usually driven through a chain system by a large sprocket associated directly with one of the rear carrying wheels and placed on one side of the box with its individual control lever, and the intermittent drive mechanism is placed with its control lever upon the opposite side and is driven by a cam associated with the rear wheel.

With spreaders having individual controls as described it frequently happens that before the entire load has been distributed the spreading operation must be stopped, as when turning at the end of a field, when the operator will manipulate the lever which stops the spreader mechanism, but at times forgets to stop the action of the conveyor, the result being that the material continues to move rearwardly into the inactive beaters and is piled against them with such force that the entire mechanism becomes choked and parts are stressed beyond the point at which they were designed to operate. In order to restore the parts to operative condition the operator must remove the material from the beater mechanism, causing undue and expensive delay.

As previously mentioned, it is customary to have the forward end of the box slightly narrower than the rear end to allow unrestricted passage for the material. This arrangement produces an appreciable space between the outer edge of the conveyor chains and the inner sides of the box, especially at the rear half of the box, permitting a definite amount of material to remain in such spaces out of the influence of the conveyor chain. The principal objects of our present invention are to provide means for preventing actuation of the conveyor without first, or simultaneously, causing the beater and spreader mechanism to be operable; to provide means for preventing material from lodging on the bottom of the box between the conveyor chains and sides of the box; and to provide an all steel vehicle of satisfactory weight. These stated objects, and others which will incidentally appear in the following description are illustrated in the accompanying drawings in which:

Figure 1 is a plan view of a manure spreader embodying out improvements;

Fig. 2, a left-hand side elevation;

Fig. 3, a sectional view taken on dotted lines 3—3 in Fig. 2; and

Fig. 4, an enlarged detail of the driving mechanism for the material conveyor, taken on dotted lines 4—4 in Fig. 1.

In the drawings the numeral 10 indicates the front wheels and 11, 12, the rear wheels of a manure spreader having suitable axle mountings for carrying the material box comprising an end gate 13, sides 14 and 15, and a bottom 16 upon or about which is mounted an endless conveyor 17, driven by sprockets 18 fastened to a shaft 19 supported in bearings 20 as shown in Fig. 2. The shaft 19 is rotated intermittently by a pawl 21 and ratchet-wheel 22, Fig. 4, actuated by cam rollers 23 carried by a rotary driver 23' of well known construction and operation and associated directly with the rear wheel 12. A quantity control arm 24 extends upwardly from the pawl and cam shoe 24' of the character disclosed in the Davis Patent No. 1,219,087, said arm having a control rod 25 attached, as at 26, the said rod extending forwardly to the usual lever and quadrant 27, as indicated in Fig. 1. As indicated, the ratchet wheel 22 is fixed to the rear conveyor shaft 19, and the pawl device 21—24' is adapted to be operated from the wheel 12 for rotating the ratchet wheel at the desired speed, and by adjusting said device the conveyor 17 may be operated at various speeds to deliver fertilizer more or less rapidly to the revolving beater 28 to obtain varied distribution of the material.

The cam-shoe 24', as explained in said patent referred to, is intermittently actuated by the rollers 23 of the rotating driver 23', and has pivotally connected to its lower end, at 25', a pendant 65 the upper end of which is pivotally secured, at 66, to a bracket 67 attached to the side 15 of the spreader. By this construction the cam-shoe will normally gravitate into the path of the rollers 23, so that unless restricted the face of the shoe will abut the roller disposed opposite it. The cam-shoe 24', Fig. 4, is adjustably held in the path of rollers 23 by the arm 24 fixedly secured, at 69, to said shoe, and equipped with a stop 70 which intermittently rests on the top surface of a guide bracket 71 secured to the vehicle body 15. By moving the upper end of said arm 24 forwardly or rearwardly the shoe will be in the path of the rollers 23 to a greater or lesser degree and the stroke of the pawl will be accordingly, the mode of operation being obvious. The arm 24 being integral with shoe 24' is pivotally attached to the pendant 65 at 25', and as the upper end of said arm is, for example, moved forwardly, the upper forward face of the shoe is caused to be moved toward the rollers 23, and therefore, as the driver 23' is rotated, carrying the said roller against the face of the shoe, said shoe and pawl 21, together with the lower ends of arm 24 and pendant 65, will be urged rearwardly and upwardly due to the upper end of pendant 65 being pivotally mounted at 66. After the roller has passed beyond the face of the shoe the entire mechanism described will automatically resume its previous relation in position to be actuated by the following roller, there being in the case illustrated, four complete cycles, or strokes, for each revolution of the roller driver 23'. Fig. 2, as stated, is an elevation of the left-hand side of the vehicle, the two near wheels being omitted. In the illustrated arrangement the upper and lower beaters, 28, 29, respectively, and the distributor 30, are driven from the main sprocket wheel 31, which is attached to rear wheel 11, through a chain 32 trained about a sprocket upon each of the beater shafts 28' and 29'. The chain 32 is arranged so that its lower run engages the drive sprocket 31, the front bight being trained about an idler sprocket 33 carried on the end of an arm 34 fulcrumed upon the side 14 of the box, as shown at 35. A vertical arm 36 is attached to or formed integrally with the arm 34, and a trunnion 37 is mounted at its upper end in which a rod 38 is freely mounted and extends forwardly therefrom to a control lever 39 supported on side 14 in any approved manner.

In carrying out our present invention we attach a rearwardly extending rod 40 to vertical arm 36, at 41, the rear end of said rod being attached to the lower end 42 of a bell-crank 43 fulcrumed at 44 upon the box side 14, the rear end of said bell crank being secured to a rod 45, at 46, the upper end of which rod is connected to a flexible chain or cable 47 passing over a sheave 48 placed some distance above the beater mechanism. The chain crosses over the box to the opposite side where it also passes over a sheave 48' and is fastened to a vertical rod 49, the lower end of which rod is attached to an arm 50 pivotally mounted, at 51, upon side 15 of the box and extending forwardly, said arm having a spring 53 attached at the end, as at 52, while the opposite end terminates in a rod 54 associated with the pawl 21 for a purpose to be described.

In operation, the box is filled with the desired material, a suitable primary mover is attached to the draw-bar, and when it is desired to begin broadcasting the material, the lever 27 is adjusted to the desired quantity which is to be used per acre, as is common, and when so adjusted it is but necessary to operate lever 39 only. The control lever 39 is set in the operating position as shown by the full lines in Fig. 2, whereupon the idler sprocket 33 is in position to cause the drive chain 32 to engage the upper portion of the main drive sprocket, and simultaneously the rod 40 causes bell crank 43 to assume the position shown, causing the rear end to rise, relieving tension on the cross chain 48, thereby causing arm 50, Fig. 4, to assume the dotted line position, and at the same time removing the pull on rod 54, which will permit spring 21' to urge the pawl 21 into engagement with the ratchet-wheel as shown. As the vehicle is moved over the field, the cam driver 23' will rotate with the rear wheel, 12, urging cam rollers 23 into momentary contact with the cam shoe 24', thus imparting a reciprocating action to the pawl and the resultant intermittent rotary motion to the ratchet wheel, which will actuate carrier 17 to move the material in the box rearwardly at a predetermined rate of speed as adjusted by lever 27 as mentioned. Simultaneously the rear wheel 11 is rotating drive sprocket 31 which imparts rotary motion to the beaters and distributor through chain 32.

When it is desired to stop broadcasting the fertilizer the operator moves lever 39 forwardly to the position indicated by dotted lines, which action causes the rod 38 to pull on arm 36, thereby raising idler sprocket 33, which elevates the lower run of chain 32 beyond the influence of the main drive sprocket 31, in which manner the beaters and associated mechanism become inoperative. As the said idler sprocket 33 is being elevated, the arm 36 draws the rod 40 forwardly, causing bell-crank 43 to pivot at 44 and urging the rear end thereof downwardly, thus pulling on the rod 45 so as to lift the arm 50, Fig. 4, into the full line position, thus disengaging the pawl 21 from the ratchet wheel through the spring and rod 53 and 54. As the vehicle continues its forward movement the pawl will have no influence upon the ratchet wheel, nor will the main drive sprocket 31 have any effect upon the beater mechanism, so that the entire spreader mechanism is rendered inactive. It is obvious that it is impossible to cause the carrier to be operated by the pawl and ratchet drive when the beaters are inactive, due to the association between the pawl 21 and bell-crank 43 through the cross-over chain 48.

Securely fastened to the bell-crank 43 or integrally formed therewith is an outwardly protruding stud 60 located so as to be under the lower side of chain 32 as shown in Fig. 2. When the chain is in the operative position (engaged with the sprocket 31) the stud 60 has no influence upon said chain, but when the idler sprocket 33 and the bell-crank are caused to be in the position indicated by dotted lines the stud 60 will prevent the lower side of the chain 32 from coming into momentary contact with the main drive sprocket 31 when the vehicle is drawn over a rough or irregular surface.

Upon the under side of the inclined box end 13, we prefer to fasten two L-shaped supports, 61 and 62, the upper vertical sides of which converge toward the center, as shown in Fig. 3, so as to provide a frictional entrance for the seat support 63 which is pivotally mounted on the vertical sides at 64, Fig. 2. When loading the box the support 63 and its seat may be pulled forwardly and downwardly for clearance and as readily returned to normal position when desired.

We claim as our invention:

1. In a vehicle of the character described including a receptacle, rotary distributing means at one end of the receptacle for scattering material discharging therefrom, means at one side of the receptacle for actuating the distributing means, a conveyor in the receptacle, a ratchet on the opposite side of the receptacle associated with the conveyor, a pawl pivotally mounted on the receptacle and engageable with the ratchet, means operable by the vehicle wheel to intermittently actuate the pawl to engage and disengage from the ratchet, and tension means extending across the vehicle and connecting the pawl and the actuating means for the distributing means to release the pawl from the ratchet when said actuating means is rendered inoperable.

2. In a vehicle of the character described including an endless conveyor, rotary distributing means having sprockets thereon and an axle having driving wheels at its opposite sides, a driving sprocket on one of the wheels, a sprocket-and-chain system associated with the distributing means and engageable with the driving sprocket, means for engaging and disengaging the chain from said driving sprocket, a bell-crank lever including means for preventing the chain from engaging said sprocket, a ratchet on the opposite side of the vehicle, a pawl engageable with the ratchet, flexible means connecting the lever and pawl, means on the opposite wheel for actuating the pawl to intermittently rotate the ratchet for moving the conveyor, and means under control of an operator for disengaging the chain from the driving sprocket and also for adjusting the lever to disengage the pawl from the ratchet to simultaneously discontinue operation of the distributing means and the conveyor.

3. In a vehicle of the character described including a conveyor and rotary distributing means, a sprocket-and-chain system for actuating the distributing means, a wheel-driven sprocket engageable with the chain for actuating the latter, means for engaging and disengaging the chain from the driven sprocket, a bell-crank lever on the vehicle, means connecting the lever with the engaging and disengaging means, a ratchet on the opposite side of the vehicle, a pawl engageable with the ratchet, a shoe associated with the pawl, means connecting the lever with the pawl to engage the latter with the ratchet, means for simultaneously engaging the chain and driven sprocket and also adjusting the pawl connecting means to engage the pawl with the ratchet as the vehicle is traveling for operating the distributing means and the conveyor, and means associated with the opposite wheel for intermittently engaging the pawl and ratchet for moving the conveyor.

4. In a vehicle of the character described including an endless conveyor, rotary distributing means having sprockets thereon and an axle having driving wheels at its opposite sides, a swinging member having a sprocket thereon, a chain running about the sprockets for actuating the distributing means, a conveyor controlling bell-crank lever on the vehicle, a rod connecting the swinging member to the lever, ratchet-and-pawl mechanism on the opposite side of the vehicle, a vertically swinging arm adjacent said mechanism and pivotally mounted on the vehicle, a tension-rod connecting said arm to the pawl, vertically movable means supporting the arm, flexible means connecting the movable means to said lever, a shoe associated with the pawl, a cam-roller associated with one of the wheels for actuating the pawl to rotate the ratchet intermittently for moving the endless conveyor, and means associated with the swinging arm for adjusting the latter and the vertically movable means connected to the lever to engage said chain with the driving sprocket and through the flexible connection between the lever and pawl to operatively engage the latter with the ratchet whereby the distributing means and conveyor are simultaneously actuated.

5. In a vehicle of the character described a wheeled receptacle, distributing means carried by the vehicle for scattering material discharging from the receptacle, means driven from a wheel of the vehicle for actuating the distributing means, control means for throwing the actuating means in and out of action, a conveyor in the receptacle arranged to urge material in the receptacle toward the distributing means, a ratchet supported from the receptacle and connected to operate the conveyor, a pawl movably mounted on the receptacle and positioned to ride on the ratchet and actuate the same, means operable by a vehicle wheel for reciprocating the pawl for actuating the ratchet, and tension means extending from the control means to the pawl to remove the pawl from contact with the ratchet when the actuating means is rendered inoperative by the control means.

SIMEON B. HENDRICKS.
JOHN M. MARKEL.